United States Patent
Lee et al.

(10) Patent No.: US 11,243,396 B2
(45) Date of Patent: Feb. 8, 2022

(54) DISPLAY APPARATUS

(71) Applicant: SAMSUNG ELECTRONICS CO., LTD., Suwon-si (KR)

(72) Inventors: Changkun Lee, Seoul (KR); Yuntae Kim, Suwon-si (KR); Geeyoung Sung, Daegu (KR); Wontaek Seo, Yongin-si (KR); Hongseok Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 481 days.

(21) Appl. No.: 16/195,272

(22) Filed: Nov. 19, 2018

(65) Prior Publication Data
US 2020/0004018 A1    Jan. 2, 2020

(30) Foreign Application Priority Data
Jun. 28, 2018    (KR) .................. 10-2018-0074919

(51) Int. Cl.
*G02B 27/01*    (2006.01)
*G02B 5/30*    (2006.01)

(52) U.S. Cl.
CPC ....... *G02B 27/0172* (2013.01); *G02B 5/3025* (2013.01); *G02B 5/3083* (2013.01)

(58) Field of Classification Search
CPC . G02B 27/0172; G02B 5/3025; G02B 5/3083
USPC .......... 359/485.01, 487.01, 489.07, 489.08, 359/489.16, 629, 630, 631, 633, 634
See application file for complete search history.

(56) References Cited

U.S. PATENT DOCUMENTS

| | | | |
|---|---|---|---|
| 2,958,258 A | * | 11/1960 | Kelly ............. H04N 9/16 348/758 |
| 4,190,856 A | * | 2/1980 | Ricks ............. H04N 13/395 348/42 |
| 5,198,928 A | | 3/1993 | Chauvin |

(Continued)

FOREIGN PATENT DOCUMENTS

| JP | 6274971 B2 | 2/2018 |
|---|---|---|
| KR | 10-2017-0032736 A | 3/2017 |
| KR | 10-1717379 B1 | 3/2017 |

OTHER PUBLICATIONS

Hu, Xinda, et al., "High-resolution optical see-through multi-focalplane head-mounted display using freeform optics", May 30, 2014, Optics Express, vol. 22, No. 11, 8 pages total.

(Continued)

*Primary Examiner* — Ricky D Shafer
(74) *Attorney, Agent, or Firm* — Sughrue Mion, PLLC

(57) ABSTRACT

Provided are a display apparatus and an electronic device including the display apparatus. The display apparatus may include a first optical combiner; a second optical combiner spaced apart from the first optical combiner; a first image forming device configured to provide a first image to the first optical combiner; a second image forming device configured to provide a second image to the second optical combiner; and a shared optical system arranged between the first and second optical combiners and the first and second image forming devices, wherein the shared optical system may include a shared optical path through which the first image and the second image are provided the first optical combiner and the second optical combiner, respectively.

34 Claims, 14 Drawing Sheets

(56) References Cited

U.S. PATENT DOCUMENTS

| | | | | |
|---|---|---|---|---|
| 5,982,343 A | * | 11/1999 | Iba | G02B 27/0172 |
| | | | | 345/8 |
| 7,048,384 B2 | * | 5/2006 | Cole | G01J 5/522 |
| | | | | 250/495.1 |
| 8,300,315 B2 | * | 10/2012 | Kobayashi | G02B 27/0172 |
| | | | | 359/630 |
| 9,304,319 B2 | | 4/2016 | Bar-Zeev et al. | |
| 9,392,218 B2 | | 7/2016 | Guo et al. | |
| 9,576,399 B2 | | 2/2017 | Lo et al. | |
| 9,726,891 B2 | | 8/2017 | Webster et al. | |
| 9,892,545 B2 | | 2/2018 | Benko et al. | |
| 2013/0135722 A1 | * | 5/2013 | Yokoyama | G02B 27/0172 |
| | | | | 359/465 |
| 2016/0161740 A1 | | 6/2016 | Bar-Zeev et al. | |
| 2016/0349518 A1 | | 12/2016 | Amitai et al. | |
| 2017/0102545 A1 | | 4/2017 | Hua et al. | |
| 2017/0236255 A1 | | 8/2017 | Wetzstein et al. | |
| 2017/0293145 A1 | | 10/2017 | Miller et al. | |
| 2017/0319051 A1 | | 11/2017 | Kuriyama | |
| 2017/0345220 A1 | | 11/2017 | Bates | |
| 2019/0324271 A1 | | 10/2019 | Lee et al. | |

OTHER PUBLICATIONS

Lee, Chang-Kun, et al., "Compact three-dimensional head-mounted display system with Savart plate", Aug. 22, 2016, Optics Express, vol. 24, No. 17, 14 pages total.
Communication dated Aug. 16, 2019, from the European Patent Office in counterpart European Application No. 19155653.9.

* cited by examiner

DISPLAY APPARATUS

CROSS-REFERENCE TO RELATED APPLICATION

This application claims priority from Korean Patent Application No. 10-2018-0074919, filed on Jun. 28, 2018, in the Korean Intellectual Property Office, the disclosure of which is incorporated herein in its entirety by reference.

BACKGROUND

1. Field

Apparatuses consistent with the present disclosure relate to a display apparatus, and more particularly, to an optical combiner type display apparatus capable of displaying multi-images.

2. Description of Related Art

As electronic devices and display apparatuses capable of realizing virtual reality (VR) have been developed, interest thereon has increased. Technologies to realize augmented reality (AR) and mixed reality (MR) as a next step of VR have been researched.

Unlike VR that is based on a complete virtual world, AR shows virtual objects or information overlapped (or combined) with an environment of the real world. Thus, AR is a display technology that further increases the realistic effect. While VR has a limited field of use such as games or virtual experiences, it is possible to apply AR to various real environments. In particular, AR has been highlighted as the next generation display technology appropriate for a ubiquitous environment or an Internet of Things (IoT) environment. AR may be an example of MR in that added information (virtual world) is shown by being mixed with the real world.

To develop display apparatuses for implementing AR or MR, various factors, such as improvement in optical performance, proper optical performance, a decrease in form factor, weight reduction, improved convenience, improvement in design freedom, etc., are to be taken into consideration.

SUMMARY

Example embodiments provide display apparatuses such as optical combiner type display apparatuses which may be used for realizing augmented reality (AR) or mixed reality (MR).

Example embodiments also provide display apparatuses such as optical combiner type display apparatuses which may have a high degree of design freedom and superior optical performance, while having a small form factor.

Example embodiments also provide display apparatuses such as optical combiner type display apparatuses which may easily implement variable characteristics such as a variable focus, and may be advantageous for improving optical performance such as an improved field of view.

Example embodiments also provide electronic devices including the display apparatuses.

Additional aspects will be set forth in part in the description which follows and, in part, will be apparent from the description, or may be learned by practice of the presented example embodiments.

According to an aspect of an example embodiment, there is provide a display apparatus including: a first optical combiner; a second optical combiner spaced apart from the first optical combiner; a first image forming device configured to provide a first image to the first optical combiner; a second image forming device configured to provide a second image to the second optical combiner; and a shared optical system arranged between the first and second optical combiners and the first and second image forming devices, wherein the shared optical system may include a shared optical path through which the first image and the second image are provided the first optical combiner and the second optical combiner, respectively.

The first image forming device may be disposed closer to the second optical combiner than to the first optical combiner, the second image forming device may be disposed closer to the first optical combiner than to the second optical combiner, the first image may be provided to the first optical combiner via the shared optical system, and the second image may be provided to the second optical combiner via the shared optical system.

A first optical path between the first image forming device and the first optical combiner and a second optical path between the second image forming device and the second optical combiner may coincide along the shared optical path.

The shared optical system may form an optical bridge that connects the first and second optical combiners to each other.

An optical process of the first image provided by the first image forming device through the shared optical system may be the same as an optical process of the second image provided by the second image forming device through the shared optical system.

The shared optical system may have a substantially symmetrical structure with respect to the first and second image forming devices.

The shared optical system may include at least one of a refractive optical member, a polarization optical member, a reflective optical member, a diffractive optical member, and a variable optical member.

The shared optical system may include a variable optical device.

The variable optical device may be located at an optically central portion of the shared optical system, and the first and second image forming devices may be provided at positions that are optically symmetrical about the variable optical device.

The variable optical device may be configured to vary a focus of light transmitted by the variable optical device.

The variable optical device may include at least one of a variable lens device and a variable mirror device.

The variable optical device may be configured to be controlled to vary optical characteristics of the variable optical device according to a signal output by at least one of the first and second image forming devices.

The optical combiner display apparatus may further include an imaging device, and the variable optical device may be configured to be controlled to vary optical characteristics of the variable optical device according to a signal output by the imaging device.

The variable optical device may be configured such that optical characteristics of the variable optical device are continuously or discontinuously modulated.

The optical combiner display apparatus may further include at least one of a first separate optical system provided between the shared optical system and the first optical combiner and a second separate optical system provided between the shared optical system and the second optical combiner, the at least one of the first separate optical system and the second separate optical system being arranged outside the shared optical system.

The first separate optical system may include at least one optical member that is provided on at least one of a side of an incident portion of the first optical combiner and a side of an exit portion of the second image forming device, and the second separate optical system may include at least one optical member that is provided on at least one of a side of an incident portion of the second optical combiner and a side of an exit portion of the first image forming device.

The optical combiner display apparatus may further include a first transflective polarizer provided between the second image forming device and the shared optical system; and a second transflective polarizer provided between the first image forming device and the shared optical system.

The first transflective polarizer may be configured to reflect light having a first polarization direction and the second transflective polarizer is configured to reflect light having a second polarization direction that is different from the first polarization direction, or the first and second transflective polarizers may be configured to reflect light having a same polarization direction, and the shared optical system includes a pair of quarter wave films that are symmetrically arranged between the first and second image forming devices.

The shared optical system may include a first transflective polarizer adjacent to the second optical combiner and a second transflective polarizer adjacent to the first optical combiner, the first transflective polarizer may be provided between the first image forming device and the second optical combiner, the second transflective polarizer may be provided between the second image forming device and the first optical combiner, and the optical combiner display apparatus further may include: a first linear polarizer provided between the first transflective polarizer and the first image forming device; a second linear polarizer provided between the second transflective polarizer and the second image forming device; a first mirror provided between the shared optical system and the first optical combiner; and a second mirror provided between the shared optical system and the second optical combiner.

The first transflective polarizer may be configured to reflect light having a first polarization direction and the second transflective polarizer is configured to reflect light having a second polarization direction that is different from the first polarization direction, or the first and second transflective polarizers may be configured to reflect light having a same polarization direction, and the shared optical system includes a pair of quarter wave films that are symmetrically arranged between the first and second image forming devices.

The shared optical system may include a first transflective polarizer adjacent to the second optical combiner and a second transflective polarizer adjacent to the first optical combiner, the first transflective polarizer may be provided between the first image forming device and the second optical combiner, the second transflective polarizer may be provided between the second image forming device and the first optical combiner, and the optical combiner display apparatus further may include: a first linear polarizer provided between the first transflective polarizer and the first image forming device; a second linear polarizer provided between the second transflective polarizer and the second image forming device; a first reflection member arranged to face the first image forming device with the first transflective polarizer interposed between the first reflection member and the first image forming device, the first reflection member being configured to generate polarization rotation; a second reflection member arranged to face the second image forming device with the second transflective polarizer interposed between the second reflection member and the second image forming device, the second reflection member being configured to generate polarization rotation; a first mirror provided between the shared optical system and the first optical combiner; and a second mirror provided between the shared optical system and the second optical combiner.

The first transflective polarizer may be configured to reflect light having a first polarization and the second transflective polarizer is configured to reflect light having a second polarization direction that is different from the first polarization direction, or the first and second transflective polarizers may be configured to reflect light having a same polarization direction, and the shared optical system further may include a pair of quarter wave films that are symmetrically arranged between the first and second image forming devices.

The display apparatus may further include: a first transflective polarizer provided between the second optical combiner and the first image forming device; a second transflective polarizer provided between the first optical combiner and the second image forming device; a first linear polarizer provided between the first transflective polarizer and the first image forming device; a second linear polarizer provided between the second transflective polarizer and the second image forming device; a first reflection member arranged to face the shared optical system with the second transflective polarizer interposed between the first reflection member and the shared optical system, the first reflection member being configured to generate polarization rotation; and a second reflection member arranged to face the shared optical system with the first transflective polarizer interposed between the second reflection member and the share optical system, the second reflection member being configured to generate polarization rotation.

The first transflective polarizer may be configured to reflect light having a first polarization and the second transflective polarizer is configured to reflect light having a second polarization direction that is different from the first polarization direction, or the first and second transflective polarizers may be configured to reflect light having a same polarization direction, and the shared optical system may include a pair of quarter wave films that are symmetrically arranged between the first and second image forming devices.

The display apparatus may further include: a first transflective polarizer provided between the second image forming device and the shared optical system; a second transflective polarizer provided between the first image forming device and the shared optical system; a first linear polarizer provided between the first image forming device and the second transflective polarizer; a second linear polarizer provided between the second image forming device and the first transflective polarizer; a first reflection member arranged to face the first optical combiner with the first transflective polarizer interposed between the first reflection member and the first optical combiner, the first reflection member being configured to generate polarization rotation; and a second reflection member arranged to face the second optical combiner with the second transflective polarizer interposed between the second reflection member and the second optical combiner, the second reflection member being configured to generate polarization rotation.

The first transflective polarizer may be configured to reflect light having a first polarization and the second transflective polarizer is configured to reflect light having a second polarization direction that is different from the first polarization direction, or wherein the first and second transflective polarizers are configured to reflect light having a same polarization direction, and the shared optical system may include a pair of quarter wave films that are symmetrically arranged between the first and second image forming devices.

The first and second images may include augmented reality or mixed reality images.

The type display apparatus may be a see-through display apparatus.

The display apparatus may be a head mounted display device.

The display apparatus may be a glasses display apparatus, and one of the first and second optical combiners may correspond to a left eye of a user and the other of the first and second optical combiners may correspond to a right eye of the user.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
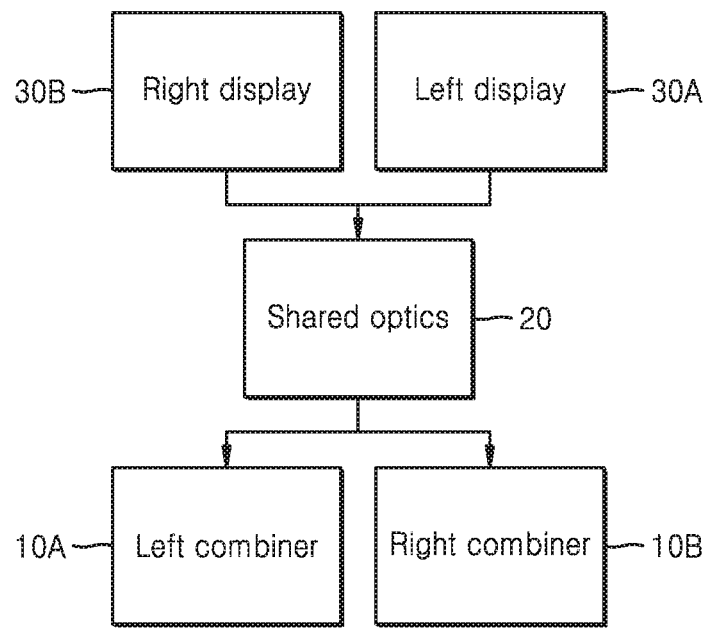
FIG. 1 is a schematic block diagram of a configuration of an optical combiner type display apparatus according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to embodiments, examples of which are illustrated in the accompanying drawings, wherein like reference numerals refer to like elements throughout. Also, the size of each layer illustrated in the drawings may be exaggerated for convenience of explanation and clarity. In this regard, the example embodiments may have different forms and should not be construed as being limited to the descriptions set forth herein. Accordingly, the example embodiments are merely described below, by referring to the figures, to explain aspects of the description. In a layer structure, when a constituent element is disposed "above" or "on" another constituent element, the constituent element may be directly on the other constituent element or above the other constituent element in a non-contact manner.

Hereinafter, display apparatuses, such as optical combiner type display apparatuses and electronic devices including the display apparatuses, according to example embodiments, are described in detail with reference to the accompanying drawings. In the accompanying drawings, the widths and thicknesses of layers or regions shown in the drawings may be rather exaggerated for clarification of the specification and convenience of explanation. Throughout the whole of the detailed description section, like reference numeral denote like constituent elements.

FIG. 1 is a schematic block diagram of a configuration of an optical combiner type display apparatus according to an example embodiment.

Referring to FIG. 1, the optical combiner type display apparatus (i.e., optical combiner apparatus) may include a first optical combiner ("Left combiner" in the figure, hereinafter referred to as a first combiner or a left-side image combining device) 10A, a second optical combiner ("Right combiner" in the figure, hereinafter referred to as a second combiner or a right-side image combining device) 10B arranged spaced apart from the first combiner 10A, a first image forming device 30A ("Left display" in the figure, also referred to as a left-side image forming device) for providing a first image (i.e., left-side image) to the first combiner 10A, and a second image forming device 30B ("Right display" in the figure, also referred to as a right-side image forming device) for providing a second image (i.e., right-side image) to the second combiner 10B. Furthermore, the display apparatus may include a shared optical system 20 ("Shared optics" in the figure, also referred to as an optical system) arranged between the first and second combiners 10A and 10B and the first and second image forming devices 30A and 30B. The shared optical system 20 may provide an optical path shared between the first image forming device 30A and the first combiner 10A and between the second image forming device 30B and the second combiner 10B.

The first combiner 10A and the second combiner 10B may be arranged to correspond to respective eyes of a user. The first combiner 10A may be a left combiner corresponding to the left eye, and the second combiner 10B may be a right combiner corresponding to the right eye. The first combiner 10A may provide the first image from the first image forming device 30A to the left eye of the user and an image different from the first image to the left eye along a different path. Similarly, the second combiner 10B may provide the second image from the second image forming device 30B to the right eye of a user and an image different from the second image to the right eye along a different path.

The first and second image forming devices 30A and 30B may include, for example, a light emitting diode (LED) display device or an organic LED (OLED) display device. An image implemented by using the first and second image forming devices 30A and 30B may be a three-dimensional (3D) image or a two-dimensional (2D) image. The 3D image may be a hologram image, a stereo image, a light field image, or an integral photography (IP) image. The first and second image forming devices 30A and 30B may be a kind of a display device or a micro-display device. The first and second image forming devices 30A and 30B may include a spatial light modulator (SLM). The SLM may be a transmissive light modulator or a reflective light modulator, or a transflective light modulator. In a detailed example, the SLM may include a liquid crystal on silicon (LCoS) panel, a liquid crystal display (LCD) panel, or a digital light projection (DLP) panel. The DLP panel may include a digital micromirror device (DMD). The configurations of the first and second image forming devices 30A and 30B are not limited to the above description, and may be variously changed.

The first image forming device 30A may be disposed above the second combiner 10B or closer to the second combiner 10B than to the first combiner 10A. The second image forming device 30B may be disposed above the first combiner 10A or closer to the first combiner 10A than to the second combiner 10B. Accordingly, the first and second images provided by the first and second image forming devices 30A and 30B may be "arranged to cross each other" with respect to the first and second combiners 10A and 10B. The first image from the first image forming device 30A may be provided to the first combiner 10A via the shared optical system 20, and the second image from the second image forming device 30B may be provided to the second combiner 10B via the shared optical system 20. A first optical path between the first image forming device 30A and the first combiner 10A and a second optical path between the second image forming device 30B and the second combiner 10B may cross each other in the shared optical system 20.

The shared optical system 20 may be configured to cause the first image provided by the first image forming device 30A and the second image provided by the second image forming device 30B to undergo the same optical process or substantially the same process through the shared optical system 20. To this end, the shared optical system 20 may have a symmetrical structure (optically symmetrical structure) or a substantially symmetrical structure with respect to the first and second image forming devices 30A and 30B. Accordingly, the first and second images from the first and second image forming devices 30A and 30B may have the same optical characteristics. The shared optical system 20 may include at least one of a refractive optical member, a polarized optical member, a reflective optical member, a diffractive optical member, and a variable optical member (variable optical device). When the shared optical system 20 includes a variable optical device, the variable optical device may be located at an optically central portion of the shared optical system 20. The first image forming device 30A and the second image forming device 30B may establish an optically symmetrical relationship with respect to the variable optical device, which is described in detail later.

Figure 2:
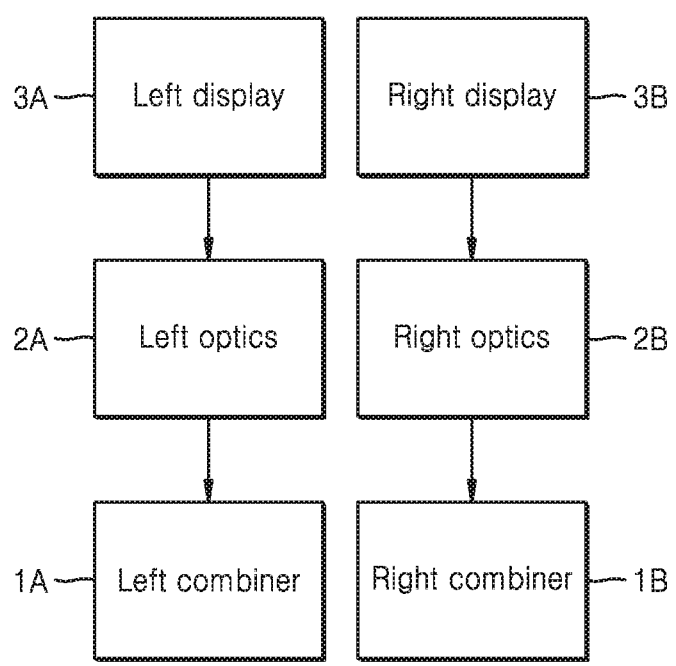
FIG. 2 is a schematic block diagram of a configuration of an optical combiner type display apparatus according to a comparative example.

FIG. 2 is a schematic block diagram of a configuration of an optical combiner type display apparatus according to a comparative example.

Referring to FIG. 2, the optical combiner type display apparatus according to a comparative example may include a first combiner 1A ("Left combiner" in the figure), a first image forming device 3A ("Left display" in the figure) corresponding to the first combiner 1A, and a first optical system 2A ("Left optics" in the figure) arranged between the first combiner 1A and the first image forming device. The optical combiner type display apparatus according to the comparative example may further include a second combiner 1B ("Right combiner" in the figure), a second image forming device 3B "Right display" in the figure) corresponding to the second combiner 1B, and a second optical system 2B ("Right optics" in the figure) arranged between the second combiner 1B and the second image forming device 3B. As the first and second image forming devices 3A and 3B that are independent and the optical systems 2A and 2B that are independent are combined with respect to both eyes of a user, respective images for both eyes may be presented.

According to the comparative example, since the elements for a device corresponding to one eye are separate from the elements for a device corresponding to the other eye, two separate optical systems may form a pair to make a system for both eyes. Accordingly, a pair of symmetrical optical systems are needed and the number of optical devices is doubled compared to a single eye system. In addition, to obtain optical performance such as a variable focus or a wide field of view, special optical devices must be added to both of the pair of symmetrical optical systems and, when the number of optical devices increases, a form factor and weight of a display apparatus are doubled.

However, in the display apparatus according to the example embodiment of FIG. 1, for example, since one or more of the optical devices are shared between the right eye system and the left eye system, the display apparatus may advantageously improve various optical performances while reducing the form factor and weight of the display apparatus. In other words, since the optical device(s) located on the shared optical path are commonly used, compared to a case in which an optical system for a single eye is independently formed, the number of optical devices may be reduced. Further, the shared optical path may be sufficiently long, design freedom may be improved, optical performance may be improved, and a special optical device may be easily adopted.

Figure 3:
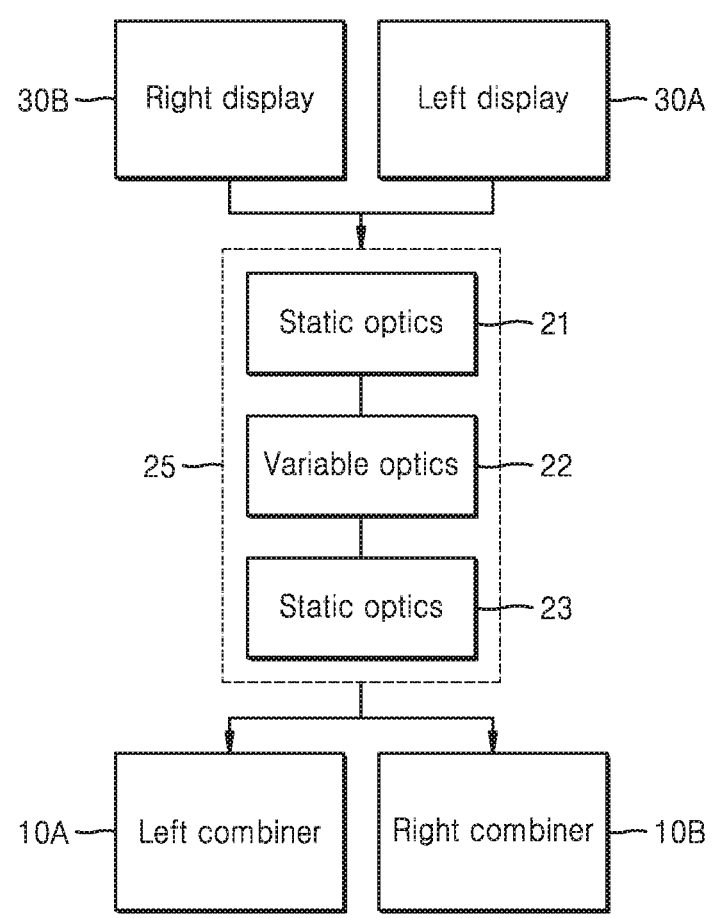
FIG. 3 is a schematic block diagram of a configuration of an optical combiner type display apparatus according to another example embodiment.

FIG. 3 is a schematic block diagram of a configuration of an optical combiner type display apparatus according to another example embodiment.

Referring to FIG. 3, the display apparatus according to an example embodiment shows a case in which a shared optical system 25 includes a variable optical device 22 ("Variable optics" in the figure). The variable optical device 22 may be located at an optically central portion of the shared optical system 25. The variable optical device 22 is shared by the first and second image forming devices 30A and 30B ("Left display" and "Right display" in the figure, respectively). The variable optical device 22 may have, for example, variable focus characteristics. In other words, the variable optical device 22 may have multi-focus characteristics. The optical characteristics (curvature, focus, optical density, etc.) of the variable optical device 22 may be modulated electrically, mechanically, or optically.

In an example embodiment, the shared optical system 25 may further include a first fixed optical member 21 ("Static optics" in the figure) disposed at one side of the variable optical device 22 and a second fixed optical member 23 ("Static optics" in the figure) disposed at the other side of the variable optical device 22. The first and second fixed optical members 21 and 23 may be devices having fixed optical characteristics. The first and second fixed optical members 21 and 23 may form a symmetrical structure (optical symmetrical structure) with respect to the variable optical device 22. The first and second fixed optical members 21 and 23 may be optionally provided.

In the comparative example of FIG. 2, to implement variable focus (multi-focus) characteristics for both eyes, a variable optical device is necessary for both sides and thus the size and complexity of a display apparatus may be increased. In contrast to the comparative example, when the variable optical device 22 is located at the optically central portion of the shared optical system 25 as illustrated in FIG. 3, and an optical structure that is symmetrical with respect to the variable optical device 22 is provided, a single variable optical device 22 may be shared between both sides, and thus variable focus (multi-focus) characteristics may be implemented for both eyes.

Additionally, the optical characteristics of the variable optical device 22 may be continuously or discontinuously modulated according to time. The optical characteristics of the variable optical device 22 may be controlled by using an electrical signal that is dependent on or synchronized to a signal of at least one of the first and second image forming devices 30A and 30B. In other words, the optical characteristics of the variable optical device 22 may be modulated according to a signal feedback of at least one of the first and second image forming devices 30A and 30B. The optical characteristics of the variable optical device 22 may be modulated in real time according to characteristics of the images provided by at least one of the first and second image forming devices 30A and 30B.

The optical combiner type display apparatus according to the example embodiments of FIGS. 1 and 3 may be configured to implement augmented reality (AR) or mixed reality (MR). In this case, one of the first and second combiners 10A and 10B may correspond to the left eye of a user, and the other of the first and second combiners 10A and 10B may correspond to the right eye of the user. Accordingly, while seeing an image of a foreground in front of the user, that is, an image of the real world, through the first and second combiners 10A and 10B, the user simultaneously sees a virtual image (display image) provided by the first and second image forming devices 30A and 30B, that is, virtual reality or virtual information. The optical combiner type display apparatus according to example embodiments may be a see-through type display apparatus (i.e., see-through display apparatus). The first and second combiners 10A and 10B may be see-through type optical systems and may provide virtual images provided by the first and second image forming devices 30A and 30B to both eyes of a user. The optical combiner type display apparatuses according to example embodiments may be a head mounted display (HMD) device. The optical combiner type display apparatuses according to example embodiments may be a glasses type display apparatus (i.e., glasses display apparatus).

According to an example embodiment, an optical combiner type display apparatus may advantageously have a small form factor with superior optical performance. Since the shared optical path may be sufficiently long, design freedom may be improved and optical performance may be improved. Variable characteristics such as a variable focus may be easily implemented, and an optical combiner type display apparatus may be implemented which is advantageous for the improvement of various optical performances such as extension of a field of view and an eyebox or improvement of depth expression. In addition, matching characteristics between a virtual image and a real world image and visual comfort may be improved, a realistic 3D image may be expressed. Furthermore, the size (volume) of a display apparatus may be reduced, wearing convenience may be improved, and various designs may be implemented.

Figure 4:
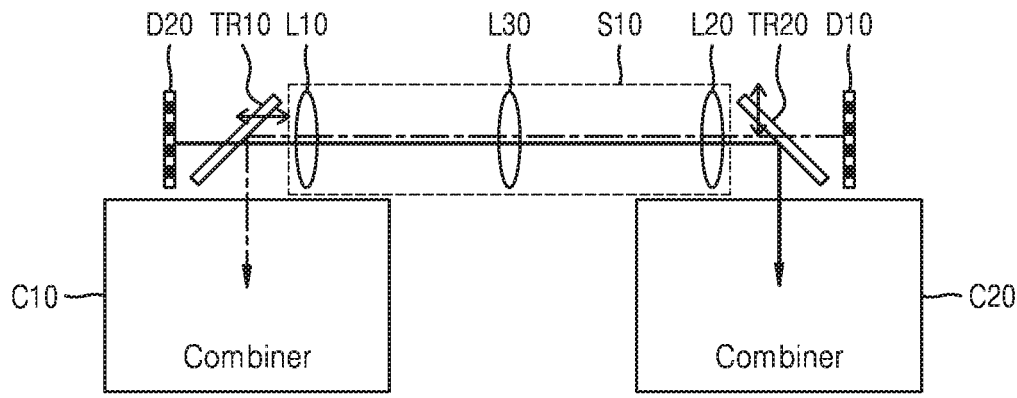
FIG. 4 illustrates a configuration of an optical combiner type display apparatus according to an example embodiment.

FIG. 4 illustrates a configuration of an optical combiner type display apparatus according to an example embodiment.

Referring to FIG. 4, an optical combiner type display apparatus may include first and second combiners C10 and C20 spaced apart from each other, a first image forming device D10 that provides a first image to the first combiner C10, and a second image forming device D20 that provides a second image to the second combiner C20. The first image forming device D10 may be disposed above the second combiner C20 in a first direction or closer to the second combiner C20 than to the first combiner C10. The second image forming device D20 may be disposed above the first combiner C10 in the first direction or closer to the first combiner C10 than to the second combiner C20. The term "first direction" may be used herein to describe a direction in which light is incident upon the first and second combiners C10 and C20. The display apparatus may include a shared optical system S10 arranged between the first and second combiners C10 and C20 and the first and second image forming devices D10 and D20. The shared optical system S10 may form an optical bridge that connects the first and second combiners C10 and C20. The shared optical system S10 may have a symmetrical structure or a substantially symmetrical structure with respect to the first and second image forming devices D10 and D20. In a detailed example, the shared optical system S10 may include a first lens portion L10, a second lens portion L20, and a third lens portion L30 between the first lens portion L10 and the second lens portion L20. The first lens portion L10 may be disposed above the first combiner C10 in the first direction or adjacent thereto, the second lens portion L20 may be disposed above the second combiner C20 in the first direction or adjacent thereto, and the third lens portion L30 may be disposed at a central portion of the shared optical system S10 or at an optically central portion thereof. The third lens portion L30 may be a relay lens system. The shape or number of each of the first to third lens portions L10, L20, and L30 is exemplary, and may be variously changed.

The display apparatus according to an example embodiment may further include a first transflective polarizer TR10 arranged between the second image forming device D20 and the shared optical system S10 and a second transflective polarizer TR20 arranged between the first image forming device D10 and the shared optical system S10. The first and second transflective polarizers TR10 and TR20 may be, for example, a wire grid polarizer (WGP). In an example embodiment, the first and second transflective polarizers TR10 and TR20 may be configured to reflect light in different directions depending on polarization direction. The first and second transflective polarizers TR10 and TR20 may be considered to be included in the shared optical system S10.

A first image generated by the first image forming device D10 may pass through the second transflective polarizer TR20 and the shared optical system S10, and then may be reflected by the first transflective polarizer TR10 and input to the first combiner C10. A second image generated by the second image forming device D20 may pass through the first transflective polarizer TR10 and the shared optical system S10, and then may be reflected by the second transflective polarizer TR20 and input to the second combiner C20. The polarization direction of the light reflected by or transmitted through each of the first and second transflective polarizers TR10 and TR20 may be controlled.

Since images intended for one eye and images intended for the other eye both pass through the shared optical system S10, effective optical design is possible compared to a case of independently configuring an optical system. Furthermore, since a display image of one side goes to a combiner of the other side, a long optical path may be obtained, and thus advantageously enables the addition of one or more optical members for the improvement of optical performance, extension of a field of view, increase of an eyebox (field of vision), expression of depth, etc. In this state, to have an image incident on the opposite combiner, the first and second transflective polarizers TR10 and TR20 may be configured to reflect light beams of different polarizations.

Figure 5:
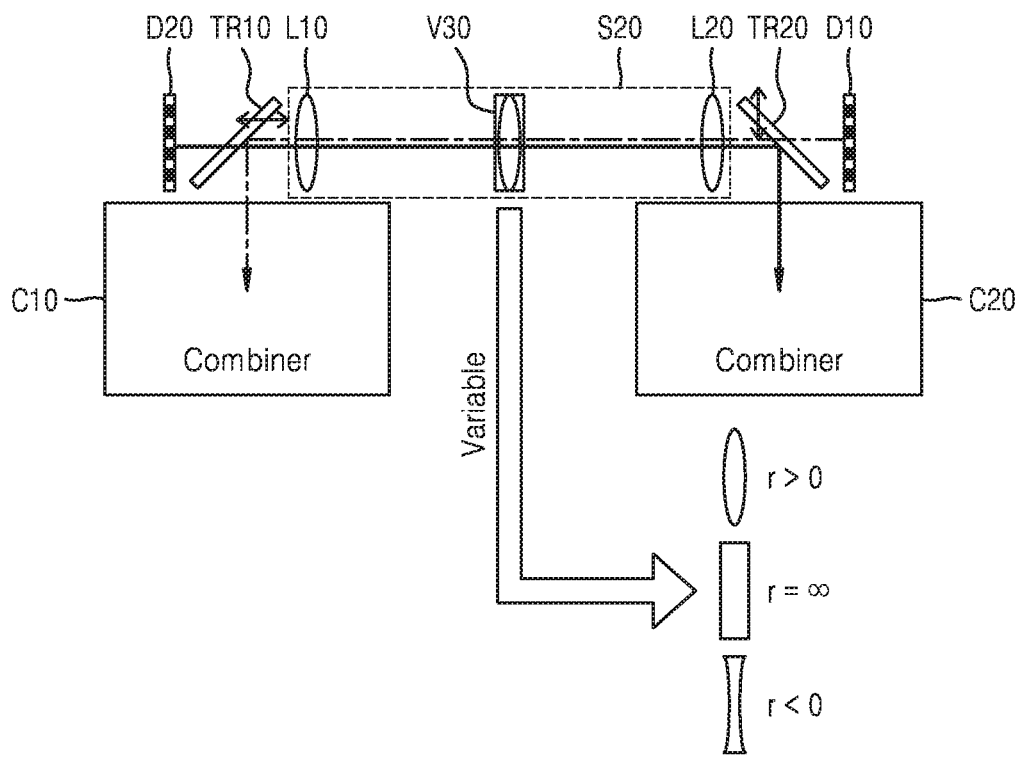
FIG. 5 illustrates a configuration of an optical combiner type display apparatus according to another example embodiment.

FIG. 5 illustrates a configuration of an optical combiner type display apparatus according to another example embodiment.

Referring to FIG. 5, a shared optical system S20 may include a variable optical device V30 at an optically central portion of the shared optical path. The variable optical device V30 may have variable focus (multi-focus) characteristics, and may include a lens type variable device (i.e., variable lens device). For example, refractive power of the variable optical device V30 may be modulated in an electrical, mechanical, or optical method, and a radius of curvature r of the variable optical device V30 may be greater or less than 0 or may become infinite. The optical characteristics (curvature, focus, optical density, etc.) of the variable optical device V30 may be continuously or discontinuously (that is, discretely) changed.

When the variable optical device V30 is located at a center of the shared optical system S20, and the shared optical system S20 is designed to be symmetrical about the variable optical device V30, the display images from both sides may be identically affected by the modulation of the variable optical device V30. Accordingly, an optical path of a display image is changed by the modulation of the variable optical device V30, and optical performance may be improved. For example, when curvature of the variable optical device V30 changes and thus a focal length is changed, a depth at which a virtual image of a display is formed is changed, thereby implementing multi-focus characteristics. The optical characteristics of the variable optical device V30 may be controlled by using an electrical signal that is dependent on or synchronized with a signal of at least one of the first and second image forming devices D10 and D20. Also, the optical characteristics of the variable optical device V30 may be controlled by using an electrical signal that is dependent on or synchronized with a signal of an imaging device that is separately provided as shown, for example, in FIG. 22.

Figure 6:
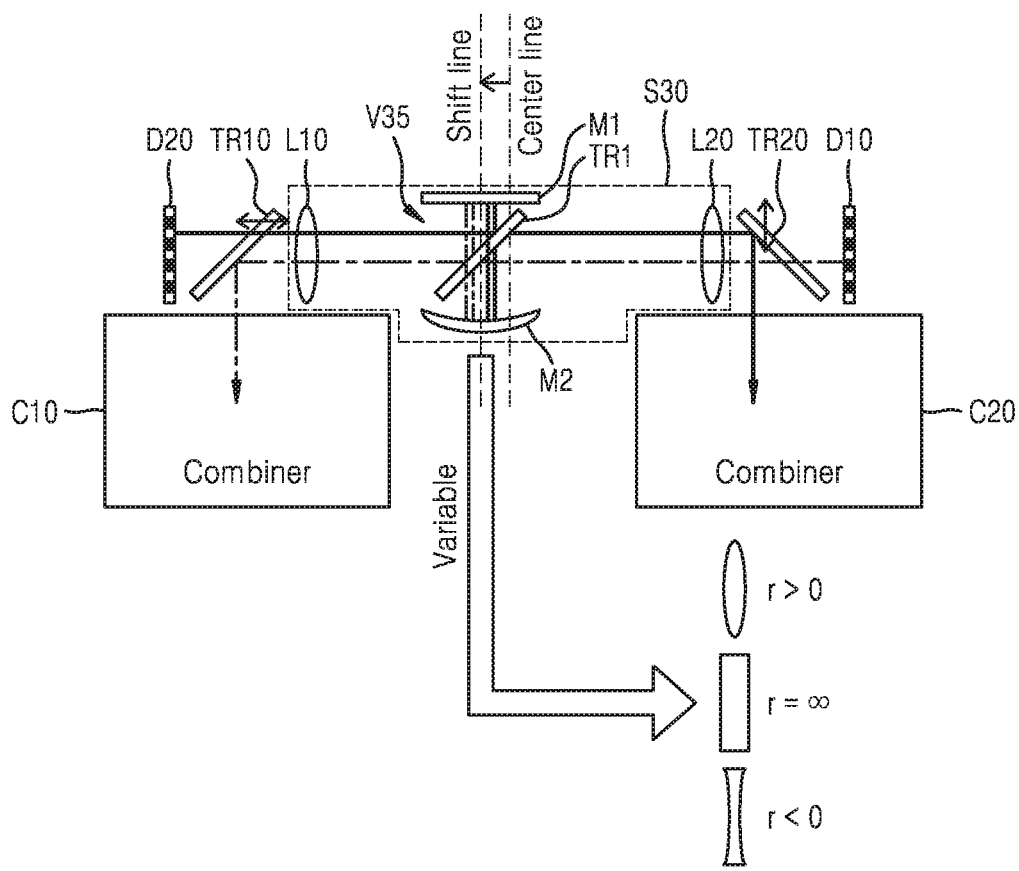
FIG. 6 illustrates a configuration of an optical combiner type display apparatus according to another example embodiment.

FIG. 6 illustrates a configuration of an optical combiner type display apparatus according to another example embodiment.

Referring to FIG. 6, a shared optical system S30 may include a variable optical device V35 at an optically central portion thereof. The variable optical device V35 may include a mirror type variable device (i.e., variable mirror device). In detail, the variable optical device V35 may include a first mirror M1, a second mirror M2 arranged to face the first mirror M1 in the first direction, and a transflective member TR1 arranged between the first and second mirrors M1 and M2. The first mirror M1 may be of a flat panel type, and the second mirror M2 may have a concave shape for focusing light. The optical characteristics of the variable optical device V35 may be modulated by a method of changing a relative positional relationship between the first mirror M1 and the second mirror M2. When the variable optical device V35 of a mirror type is used, the center portion of the variable optical device V35 may be located on a line shifted by a certain distance from a physical center line of the shared optical system S30. In other words, the variable optical device V35 may be positioned closer to one side of the apparatus than the other. This is to compensate for a difference in the optical path of the left and right images, and thus the variable optical device V35 may be located at an optically central portion of the shared optical system S30. Accordingly, the first and second image forming devices D10 and D20 may be in an optically symmetrical state with respect to the variable optical device V35 even though the variable optical device V35 is physically closer to one of the first and second image forming devices D10 and D20 than the other.

The configurations of the variable optical devices V30 and V35 described with reference to FIGS. 5 and 6 are examples, and embodiments of the disclosure are not limited thereto. Variable other optical devices having various structures may be applied to the shared optical systems S20 and S30.

Figure 7:
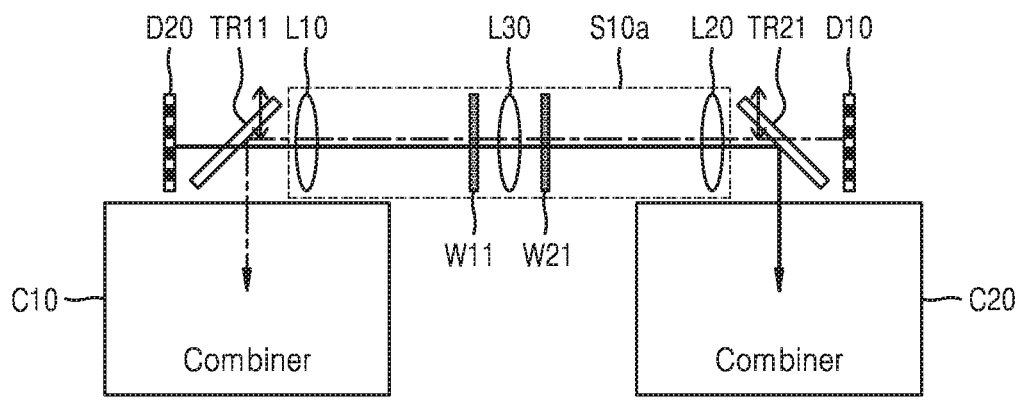
FIG. 7 illustrates a configuration of an optical combiner type display apparatus according to another example embodiment.

FIG. 7 illustrates a configuration of an optical combiner type display apparatus according to another example embodiment.

Referring to FIG. 7, the example embodiment may be modified from the configuration of FIG. 4. In an example embodiment, first and second transflective polarizers TR11 and TR21 may be configured to reflect light having the same polarization direction. A shared optical system S10a may include a pair of quarter wave films (QWFs) W11 and W21 that are symmetrically arranged between the first and second image forming devices D10 and D20. The third lens portion L30 may be arranged between the first QWF W11 and the second QWF W21. A QWF may be a phase retardation film, and the pair of QWFs W11 and W21 may together rotate polarization by 90°.

When the first and second transflective polarizers TR11 and TR21 at both sides are configured to reflect light having the same polarization direction, the pair of QWFs W11 and W21 are symmetrically inserted in the shared optical system S10a, and thus polarization of an image is rotated after passing through one of the first and second transflective polarizers TR11 and TR21 so that the light may be reflected by the opposite one of the first and second transflective polarizers TR11 and TR21 and input to one of the first and second combiners C10 and C20. In an example embodiment, since the optical elements of the display apparatus are arranged to be optically symmetrical, the uniformity of light may be improved.

Figure 8:
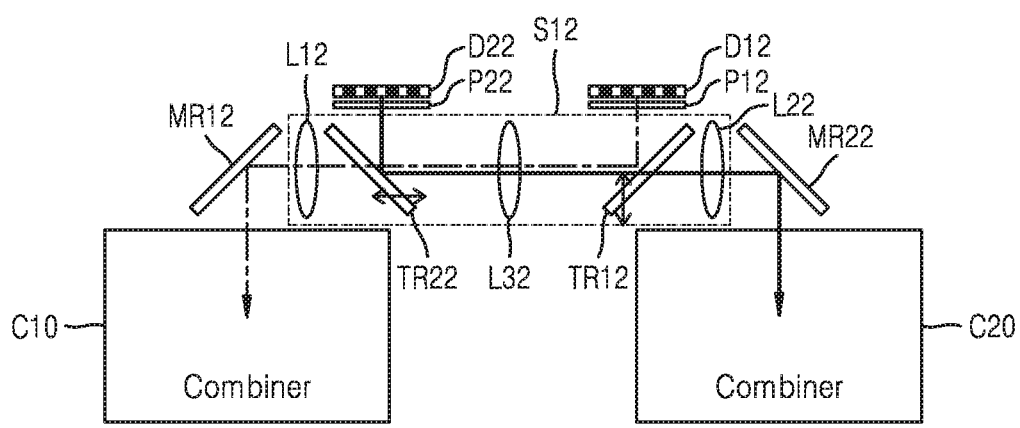
FIG. 8 illustrates a configuration of a display apparatus according to another example embodiment.

FIG. 8 illustrates a configuration of a display apparatus according to another example embodiment.

Referring to FIG. 8, a display apparatus according to an example embodiment may include first and second image forming devices D12 and D22 arranged parallel to a line connecting the centers of the first and second combiners C10 and C20 in a second direction perpendicular to the first direction. The first image forming device D12 may be disposed adjacent to the second combiner C20, and the second image forming device D22 may be disposed adjacent to the first combiner C10. The display apparatus may further include a shared optical system S12. The shared optical system S12 may include a first transflective polarizer TR12 adjacent to the second combiner C20 and a second transflective polarizer TR22 adjacent to the first combiner C10. The first image forming device D12 may be disposed above the first transflective polarizer TR12 in the first direction, and the second image forming device D22 may be disposed above the second transflective polarizer TR22 in the first direction. Furthermore, the display apparatus may further include a first linear polarizer P12 between the first transflective polarizer TR12 and the first image forming device D12, a second linear polarizer P22 between the second transflective polarizer TR22 and the second image forming device D22, a first mirror MR12 between the shared optical system S12 and the first combiner C10, and a second mirror MR22 between the shared optical system S12 and the second combiner C20. The first mirror MR12 and the second mirror MR22 may be a simple mirror. The shared optical system S12 may further include a first lens portion L12, a second lens portion L22, and a third lens portion L32.

The display apparatus according to an example embodiment may be configured such that the first and second image forming devices D12 and D22 are located above the first and second combiners C10 and C20 in the first direction, and images from the first and second image forming devices D12 and D22 are input to the opposite one of the first and second combiners C10 and C20 by passing through the shared optical system S12. In this state, the first and second transflective polarizers TR12 and TR22 may be configured to reflect light in different directions depending on polarization direction. The first and second linear polarizers P12 and P22 may be configured to polarize light in different directions from each other. In an example embodiment, since the first and second image forming devices D12 and D22 are disposed above the first and second combiners C10 and C20 in the first direction to emit light in the first direction, compared to a case in which the first and second image forming devices D12 and D22 are arranged to emit light in the second direction, a width of the display apparatus may be reduced.

Figure 9:
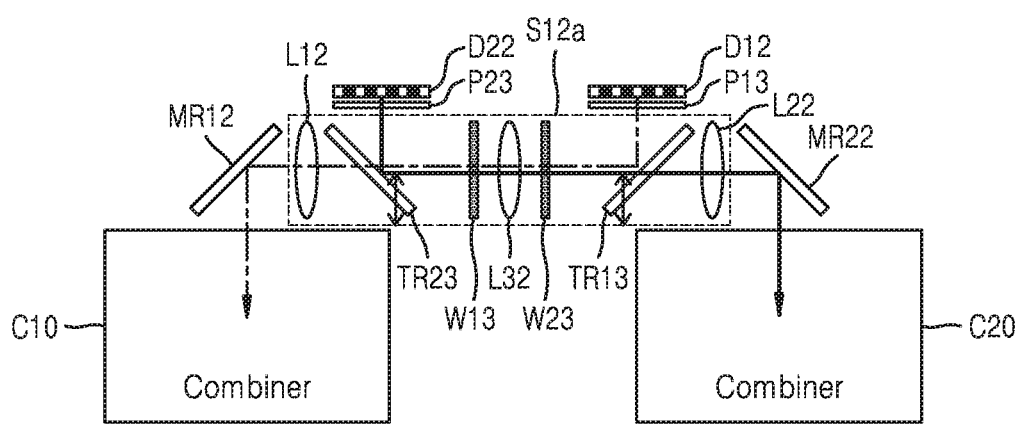
FIG. 9 illustrates a configuration of a display apparatus according to another example embodiment.

FIG. 9 illustrates a configuration of a display apparatus according to another example embodiment.

Referring to FIG. 9, the example embodiment may be a modification of the configuration of FIG. 8. In an example embodiment, first and second transflective polarizers TR13 and TR23 may be configured to reflect light having the same polarization direction. A shared optical system S12a may include a pair of QWFs W13 and W23 that are symmetrically arranged between the first and second image forming devices D12 and D22. The pair of QWFs W13 and W23 may together rotate polarization of the light transmitted through the QWFs W13 and W23 by 90°. First and second linear polarizers P13 and P23 may be configured to polarize the light in the same direction. In an example embodiment, since the optical elements are arranged to be optically symmetrical, the uniformity of light may be improved.

Figure 10:
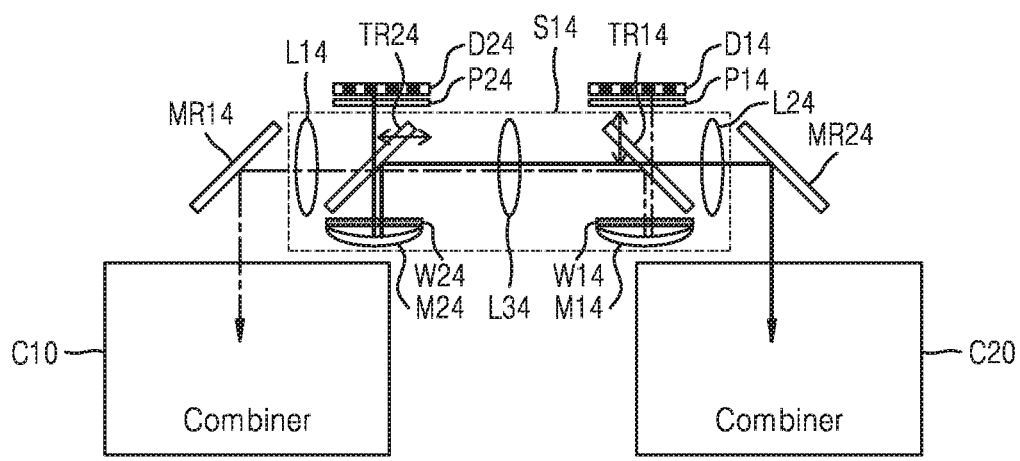
FIG. 10 illustrates a configuration of a display apparatus according to another example embodiment.

FIG. 10 illustrates a configuration of a display apparatus according to another example embodiment.

Referring to FIG. 10, a display apparatus according to an example embodiment may include first and second image forming devices D14 and D24 disposed above the first and second combiners C10 and C20 in the first direction. A shared optical system S14 may include a first transflective polarizer TR14 adjacent to the second combiner C20 and a second transflective polarizer TR24 adjacent to the first combiner C10. The arrangement direction of the first and second transflective polarizers TR14 and TR24 may be different from that of the first and second transflective polarizers TR12 and TR22 of FIG. 8. In other words, the first and second transflective polarizers TR14 and TR24 may be configured to reflect light received from the image forming devices D14 and D24 away from an optical center of the shared optical system S14. The display apparatus may include a first linear polarizer P14 between the first transflective polarizer TR14 and the first image forming device D14, a second linear polarizer P24 between the second transflective polarizer TR24 and the second image forming device D24, a first reflection member M14+W14 arranged to face the first image forming device D14 in the first direction with the first transflective polarizer TR14 interposed therebetween, and configured to generate polarization rotation, and a second reflection member M24+W24 arranged to face the second image forming device D24 in the first direction with the second transflective polarizer TR24 interposed therebetween, and configured to generate polarization rotation. The first reflection member M14+W14 may include a first reflection mirror M14 and a first QWF W14. As light passes twice through the first QWF W14, polarization rotation may be generated. Similarly thereto, the second reflection member M24+W24 may include a second reflection mirror M24 and a second QWF W24. As light passes twice through the second QWF W24, polarization rotation may be generated. The first and second reflection mirrors M14 and M24 may be a focusing mirror member, and may have a concave mirror shape. The first and second transflective polarizers TR14 and TR24 may be configured to reflect light having different polarization directions from each other, and the first and second linear polarizers P14 and P24 may be configured to polarize light in different directions from each other. The display apparatus may further include a first mirror MR14 between the shared optical system S14 and the first combiner C10 and a second mirror MR24 between the shared optical system S14 and the second combiner C20, and the first and second mirrors MR14 and MR24 may be simple mirrors. The shared optical system S14 may further include a first lens portion L14, a second lens portion L24, and a third lens portion L34.

In the display apparatus according to an example embodiment, since the first and second image forming devices D14 and D24 are located above the first and second combiners C10 and C20 in the first direction, and the first reflection member M14+W14 and the second reflection member M24+W24 causing polarization rotation are included to further increase a length of the shared optical path, optical performance may be improved.

Figure 11:
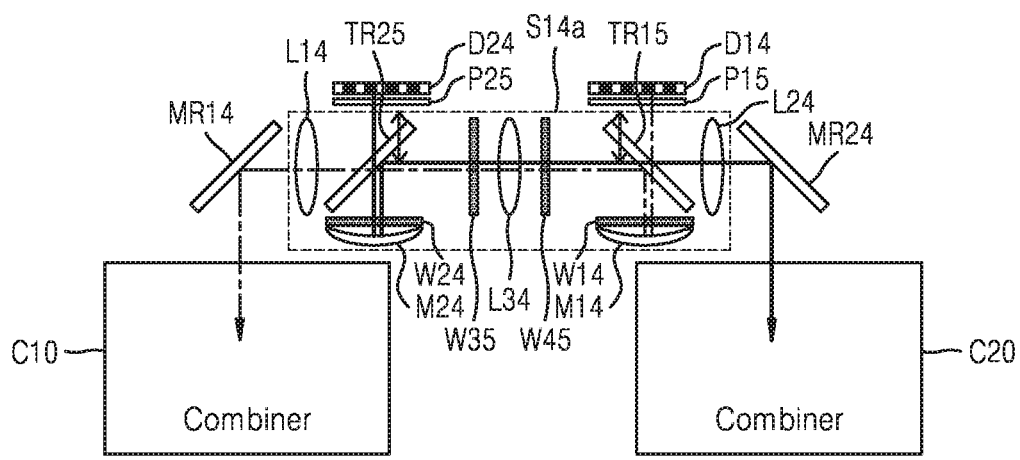
FIG. 11 illustrates a configuration of a display apparatus according to another example embodiment.

FIG. 11 illustrates a configuration of a display apparatus according to another example embodiment.

Referring to FIG. 11, the example embodiment may be a modification of the configuration of FIG. 10. In an example embodiment, first and second transflective polarizers TR15 and TR25 may be configured to reflect light having the same polarization direction. A shared optical system S14a may include a pair of QWFs W35 and W45 that are symmetrically arranged between the first and second image forming devices D14 and D24. The pair of QWFs W35 and W45 may include the third QWF W35 and the fourth QWF W45. First and second linear polarizers P15 and P25 may be configured to polarize light in the same direction. In an example embodiment, since the optical elements are arranged to be optically symmetrical, the uniformity of light may be improved.

Figure 12:
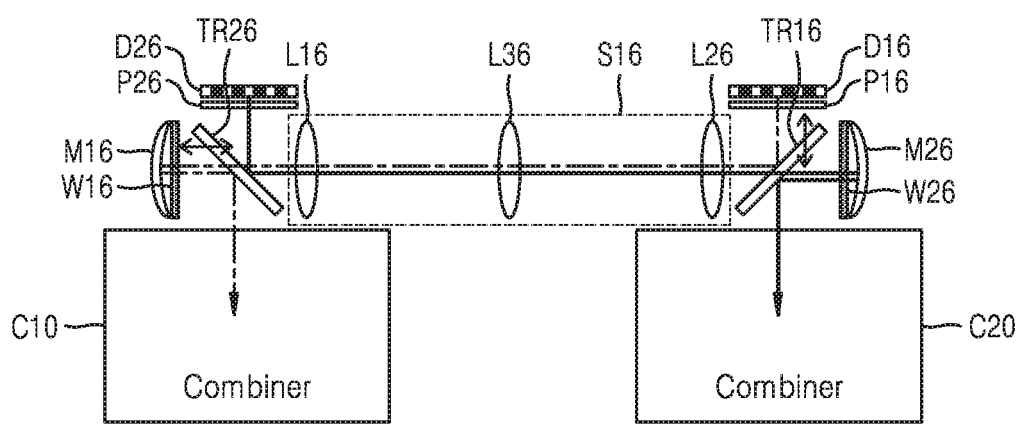
FIG. 12 illustrates a configuration of a display apparatus according to another example embodiment.

FIG. 12 illustrates a configuration of a display apparatus according to another example embodiment.

Referring to FIG. 12, the display apparatus according to an example embodiment may include first and second image forming devices D16 and D26 disposed above the first and second combiners C10 and C20 in the first direction. The display apparatus may further include a first transflective polarizer TR16 between the second combiner C20 and the first image forming device D16 in the first direction, a second transflective polarizer TR26 between the first combiner C10 and the second image forming device D26 in the first direction, a first linear polarizer P16 between the first transflective polarizer TR16 and the first image forming device D16, a second linear polarizer P26 between the second transflective polarizer TR26 and the second image forming device D26, a first reflection member M16+W16 arranged to face a shared optical system S16 with the second transflective polarizer TR26 interposed therebetween in the second direction, and configured to generate polarization rotation, and a second reflection member M26+W26 arranged to face the shared optical system S16 with the first transflective polarizer TR16 interposed therebetween in the second direction, and configured to generate polarization rotation. The first reflection member M16+W16 may include the first reflection mirror M16 and the first QWF W16, and the second reflection member M26+W26 may include the second reflection mirror M26 and the second QWF W26. The first and second transflective polarizers TR16 and TR26 may be configured to reflect light having different polarization directions from each other, and the first and second linear polarizers P16 and P26 may be configured to polarize light in different directions from each other. The shared optical system S16 may include a first lens portion L16, a second lens portion L26, and a third lens portion L36. The first and second transflective polarizers TR16 and TR26 may be considered to be included in the shared optical system S16. Furthermore, in some cases, the first reflection member M16+W16 and the second reflection member M26+W26 may be considered to be included in the shared optical system S16.

In the display apparatus according to an example embodiment, the first and second image forming devices D16 and D26 are disposed above the first and second combiners C10 and C20 in the first direction, and the images reflected by the first and second transflective polarizers TR16 and TR26 undergo polarization rotation by the first and second reflection members M16+W16 and M26+W26 at the opposite side and input to the first and second combiners C10 and C20. According to an example embodiment, a long shared optical path may be obtained.

Figure 13:
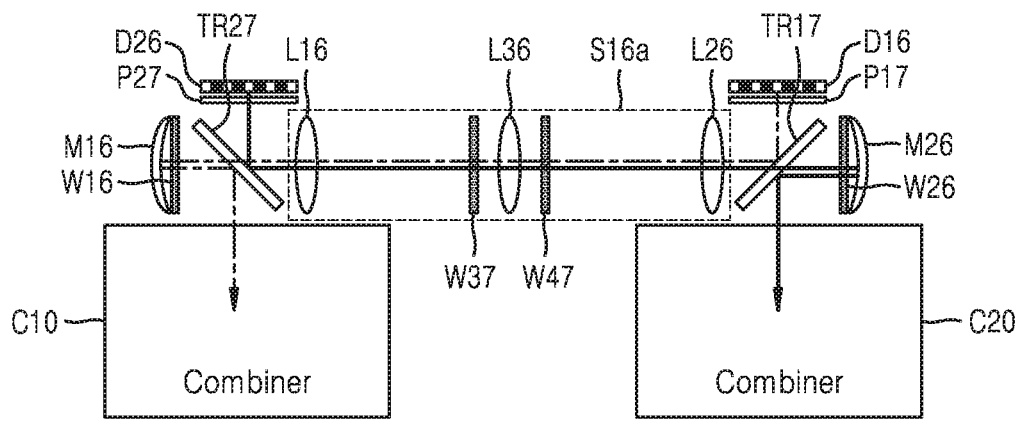
FIG. 13 illustrates a configuration of a display apparatus according to another example embodiment.

FIG. 13 illustrates a configuration of a display apparatus according to another example embodiment.

Referring to FIG. 13, the example embodiment may be a modification of the configuration of FIG. 12. In an example embodiment, first and second transflective polarizers TR17 and TR27 may be configured to reflect light having the same polarization direction. A shared optical system S16a may include a pair of QWFs W37 and W47 that are symmetrically arranged between the first and second image forming devices D16 and D26. The pair of QWFs W37 and W47 may be the third QWF W37 and the fourth QWF W47. First and second linear polarizers P17 and P27 may be configured to polarize light in the same direction. In an example embodiment, since the optical elements are arranged to be optically symmetrical, the uniformity of light may be improved.

Figure 14:
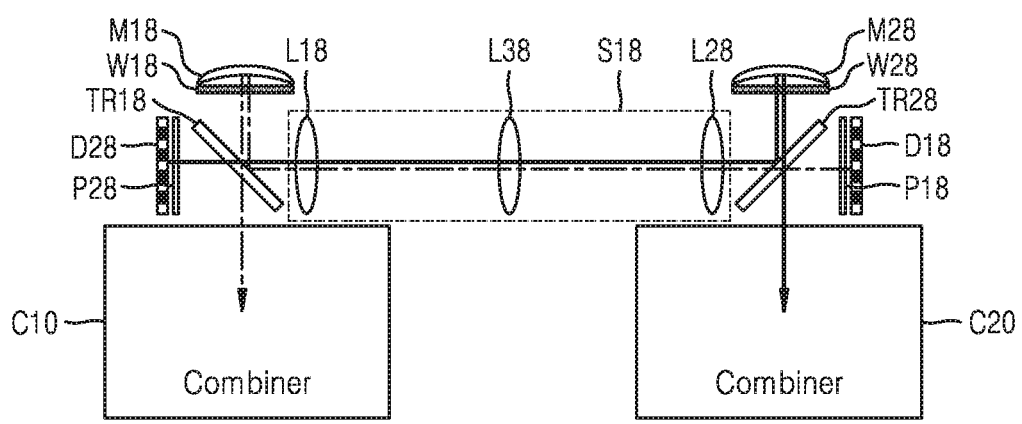
FIG. 14 illustrates a configuration of a display apparatus according to another example embodiment.

FIG. 14 illustrates a configuration of a display apparatus according to another example embodiment.

Referring to FIG. 14, the display apparatus according to an example embodiment may include first and second image forming devices D18 and D28 arranged above the first and second combiners C10 and C20 in the first direction and may be configured to emit light in the second direction. The first image forming device D18 may be disposed above the second combiner C20 in the first direction, and the second image forming device D28 may be disposed above the first combiner C10 in the first direction. The display apparatus may further include a first transflective polarizer TR18 between the second image forming device D28 and a shared optical system S18 in the second direction, a second transflective polarizer TR28 between the first image forming device D18 and the shared optical system S18 in the second direction, a first linear polarizer P18 between the first image forming device D18 and the second transflective polarizer TR28, a second linear polarizer P28 between the second image forming device D28 and the first transflective polarizer TR18, a first reflection member M18+W18 arranged to face the first combiner C10 in the first direction with the first transflective polarizer TR18 interposed therebetween, and configured to generate polarization rotation, and a second reflection member M28+W28 arranged to face the second combiner C20 in the first direction with the second transflective polarizer TR28 interposed therebetween, and configured to generate polarization rotation. The first reflection member M18+W18 may include the first reflection mirror M18 and the first QWF W18, and the second reflection member M28+W28 may include the second reflection mirror M28 and the second QWF W28. The first and second transflective polarizers TR18 and TR28 may be configured to reflect light having different polarization directions from each other, and the first and second linear polarizers P18 and P28 may be configured to polarize light in different directions from each other. The shared optical system S18 may include a first lens portion L18, a second lens portion L28, and a third lens portion L38. The first and second transflective polarizers TR18 and TR28 may be considered to be included in the shared optical system S18. Furthermore, in some cases, the first reflection member M18+W18 and the second reflection member M28+W28 may be considered to be included in the shared optical system S18.

In the display apparatus according to an example embodiment, the first and second image forming devices D18 and D28 are located above the first and second combiners C10 and C20 in the first direction, and the images reflected by the first and second transflective polarizers TR18 and TR28 undergo polarization rotation by the first and second reflection members M18+W18 and M28+W28 and input to the first and second combiners C10 and C20. According to an example embodiment, a long shared optical path may be obtained.

Figure 15:
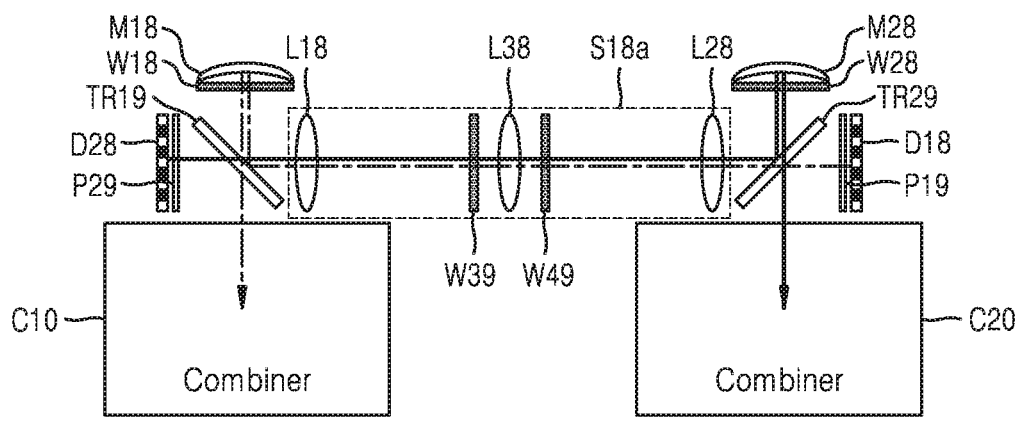
FIG. 15 illustrates a configuration of a display apparatus according to another example embodiment.

FIG. 15 illustrates a configuration of a display apparatus according to another example embodiment.

Referring to FIG. 15, the example embodiment may be a modification of the configuration of FIG. 14. In an example embodiment, first and second transflective polarizers TR19 and TR29 may be configured to reflect light having the same polarization direction. A shared optical system S18a may include a pair of QWFs W39 and W49 that are symmetrically arranged between the first and second image forming devices D18 and D28. First and second linear polarizers P19 and P29 may be configured to polarize light in the same direction. In an example embodiment, since the optical elements are arranged to be optically symmetrical, the uniformity of light may be improved.

According to another example embodiment, a display apparatus may further include at least one independent optical system (separate optical system) arranged outside the shared optical system. For example, the display apparatus may further include at least one of a first separate optical system provided at the side of the first combiner C10 and a second separate optical system provided at the side of the second combiner C20. The first separate optical system may include at least one optical member that is disposed at at least one of an incident portion of the first combiner C10 and an exit portion of the second image forming device D20. The second separate optical system may include at least one optical member that is disposed at at least one of an incident portion of the second combiner C20 and an exit portion of the first image forming device D10. Examples of adopting the first and second separate optical systems are illustrated in FIGS. 16 to 21.

FIGS. 16 to 21 illustrate configurations of a display apparatus according to another example embodiment.

Figure 16:
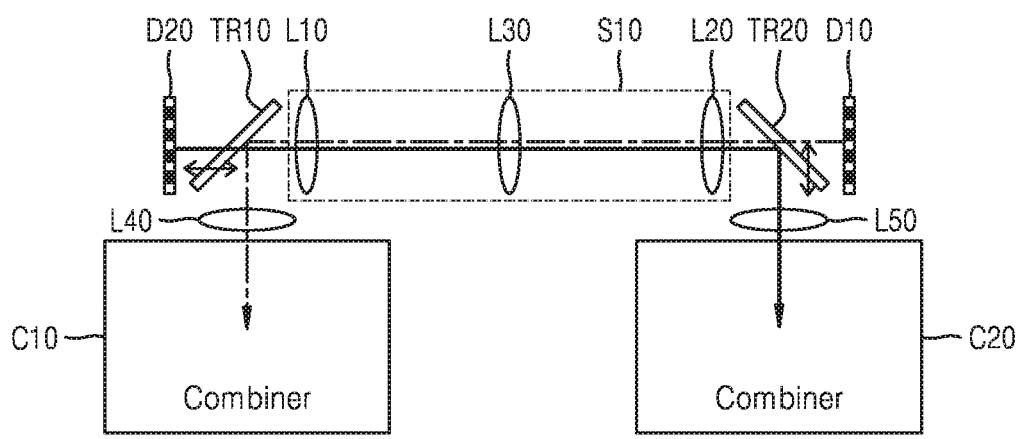
FIGS. 16 to 21 illustrate configurations of a display apparatus according to another example embodiment.
Figure 17:
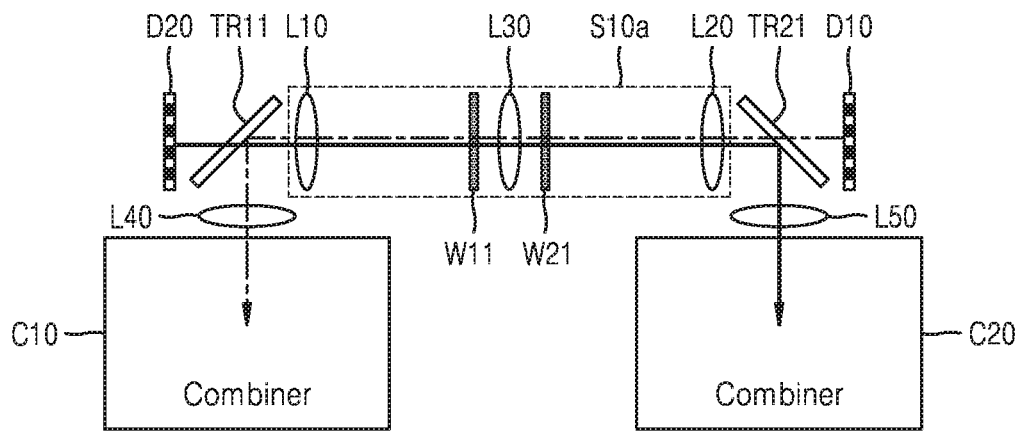

Referring to FIGS. 16 and 17, a first additional optical member L40 may be further provided above the incident portion of the first combiner C10 in the first direction, and a second additional optical member L50 may be further provided above the incident portion of the second combiner C20 in the first direction. FIG. 16 may be a modification of FIG. 4, and FIG. 17 may be a modification of FIG. 7.

Figure 18:
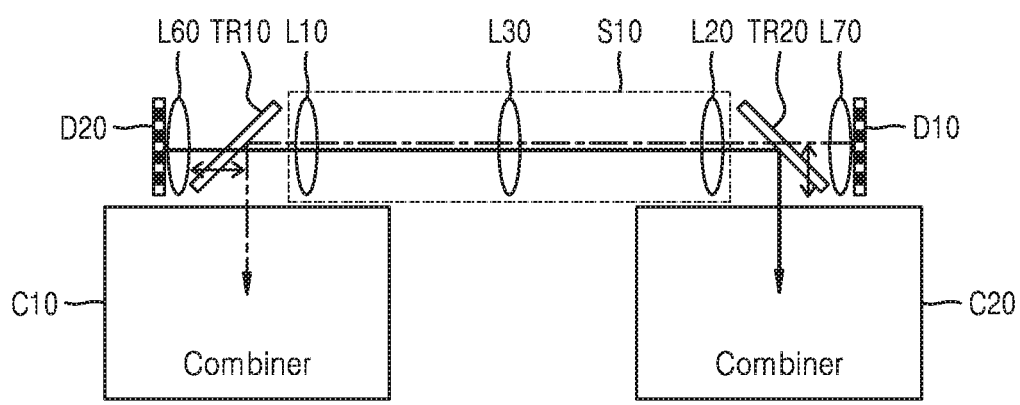
Figure 19:
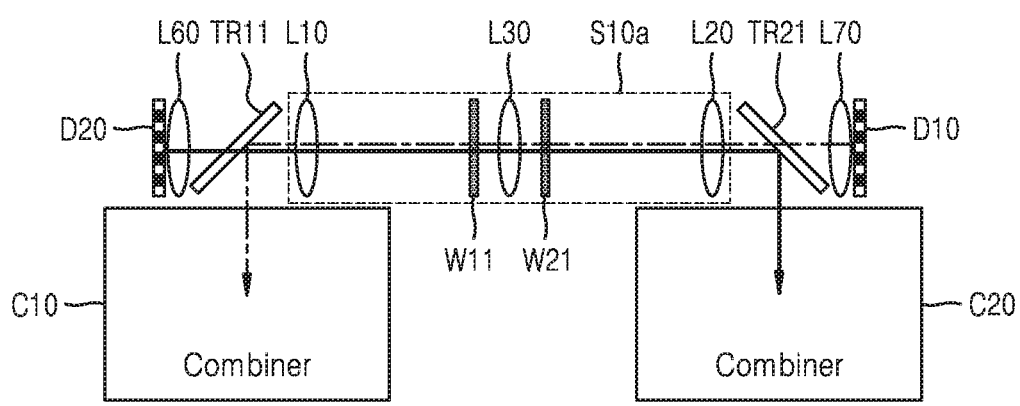

Referring to FIGS. 18 and 19, a third additional optical member L60 may be further provided at the exit portion of the second image forming device D20 between the second image forming device D20 and the first transflective polarizer TR10 in the second direction, and a fourth additional optical member L70 may be further provided at the exit portion of the first image forming device D10 between the first image forming device D10 and the second transflective polarizer TR20 in the second direction. FIG. 18 may be a modification of FIG. 4, and FIG. 19 may be a modification of FIG. 7.

Figure 20:
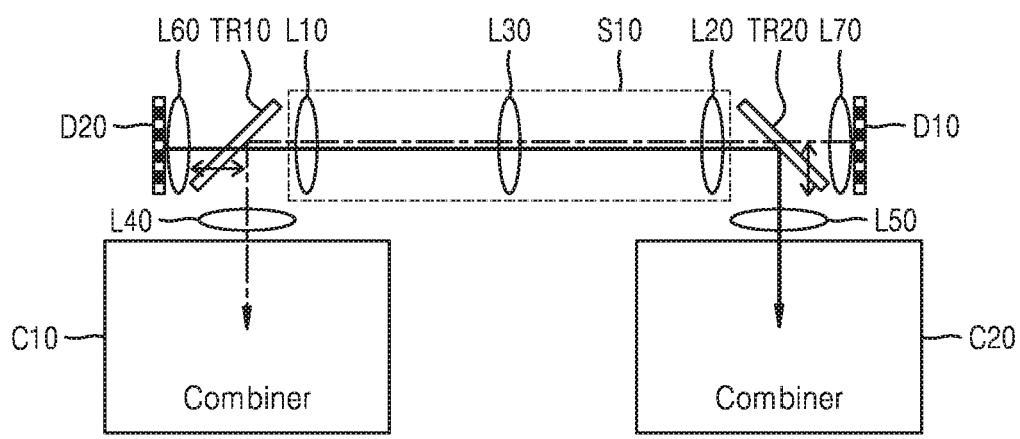
Figure 21:
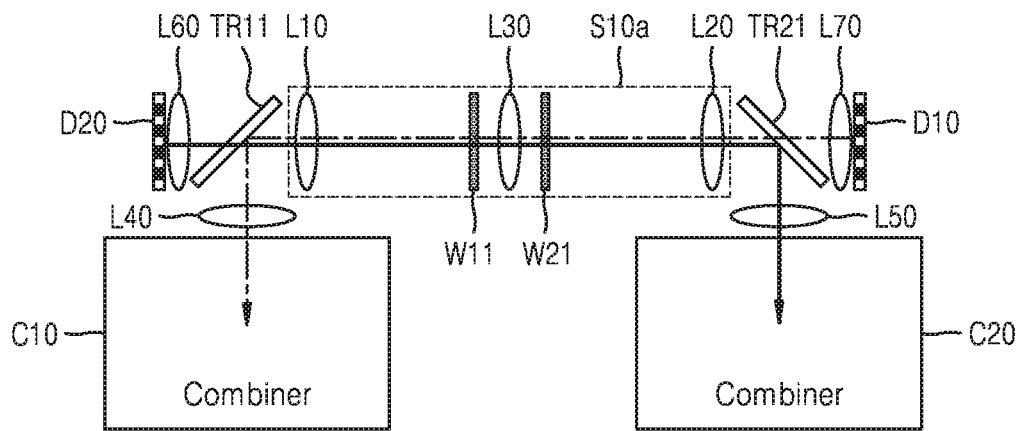

Referring to FIGS. 20 and 21, the first additional optical member L40 and the third additional optical member L60 may be further provided at the first combiner C10, and the second additional optical member L50 and the fourth additional optical member L70 may be further provided at the second combiner C20. The first additional optical member L40 may be further provided above the incident portion of the first combiner C10 in the first direction, and the second additional optical member L50 may be further provided above the incident portion of the second combiner C20 in the first direction. The third additional optical member L60 may be further provided at the exit portion of the second image forming device D20 between the second image forming device D20 and the first transflective polarizer TR10 in the second direction, and the fourth additional optical member L70 may be further provided at the exit portion of the first image forming device D10 between the first image forming device D10 and the second transflective polarizer TR20 in the second direction.

As in the example embodiments of FIGS. 16 to 21, as at least one independent optical member is provided at the sides of the first and second combiners C10 and C20, the optical performance of a display apparatus may be further improved.

Although not illustrated, the variable optical devices described with reference to FIGS. 5 and 6 may be applied to the shared optical system of the example embodiments of FIGS. 7 to 21. Furthermore, in the example embodiments of FIGS. 4 to 21, although the first and second image forming devices, for example, the first and second image forming devices D10 and D20 of FIG. 4, may be actual image forming devices, in some cases, the first and second image forming devices may be virtual or imaged image forming devices. The virtual image forming device may be a virtual image that is formed by an actual image forming device. When the first image forming device D10 is a first virtual image forming device and the second image forming device D20 is a second virtual image forming device, a first actual image forming device adjacent to the first virtual image forming device may be further provided, and a second actual image forming device adjacent to the second virtual image forming device may be further provided. In addition, the configurations of the display apparatuses according to the example embodiments of FIGS. 4 to 21 may be changed in various ways.

Figure 22:
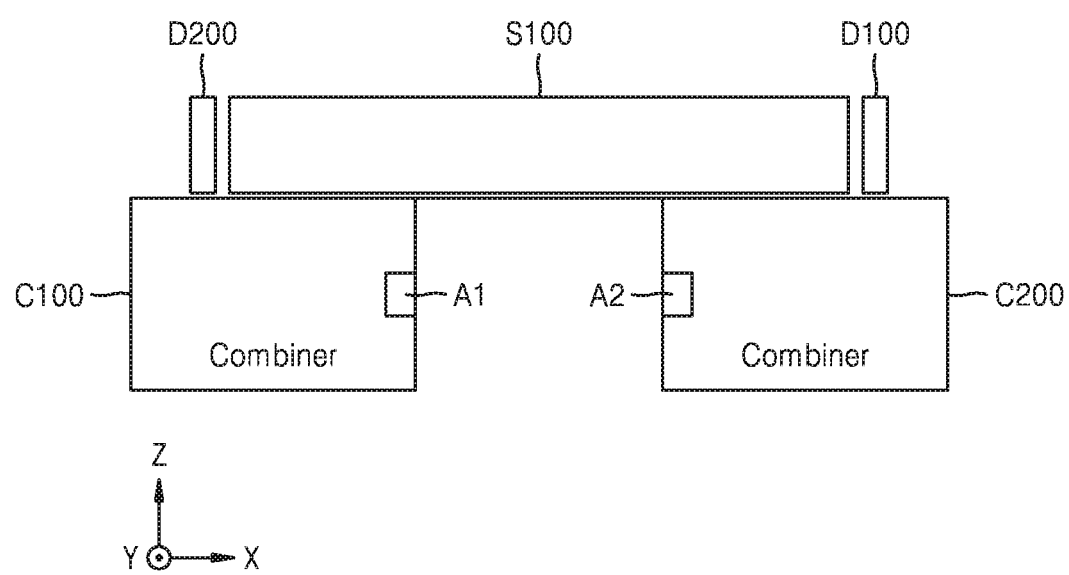
FIG. 22 illustrates a configuration of a display apparatus according to another example embodiment.

FIG. 22 illustrates a configuration of a display apparatus according to another example embodiment.

Referring to FIG. 22, the display apparatus according to an example embodiment may include a first combiner C100, a second combiner C200, a first image forming device D100, a second image forming device D200, and a shared optical system S100. The first image forming device D100 may be disposed above the second combiner C200 in the first direction or adjacent thereto, and the second image forming device D200 may be disposed above the first combiner C100 in the first direction or adjacent thereto. The shared optical system S100 may be provided between the first image forming device D100 and the second image forming device D200 in the second direction, and may form an optical bridge that connects the first and second combiners C100 and C200.

The display apparatus may further include at least one of imaging devices A1 and A2. For example, the first imaging device A1 may be disposed in the first combiner C100 or adjacent thereto, and the second imaging device A2 may be disposed in the second combiner C200 or adjacent thereto. The imaging devices A1 and A2 may be camera devices to track the eyes of a user. A display image may be controlled according to the tracking of the user's eyes. When the shared optical system S100 includes a variable optical device, the optical characteristics of the variable optical device may be controlled by using an electrical signal that is dependent on or synchronized with a signal of at least one of the first and second imaging devices A1 and A2. Any one of the first and second imaging devices A1 and A2 may not be provided. In other words, only one of the first and second imaging devices A1 and A2 may be used. Furthermore, an external camera device for a different use may be used instead of using the imaging devices A1 and A2 for tracking the user's eyes, or the optical characteristics of the variable optical device may be controlled by using an electrical signal that is dependent on or synchronized with a signal of the external camera device.

Figure 23:
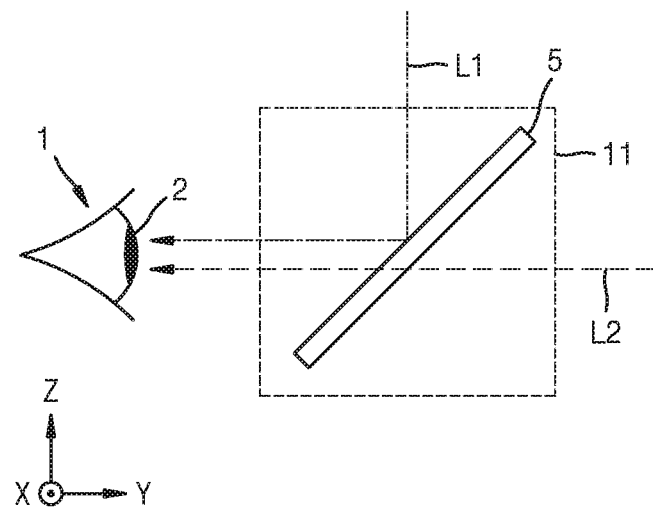
FIG. 23 illustrates a configuration of an optical combiner applicable to a display apparatus according to an example embodiment.

FIG. 23 illustrates a configuration of an optical combiner applicable to a display apparatus according to an example embodiment.

Referring to FIG. 23, an optical combiner (hereinafter, referred to as the combiner) 11 that is applicable to display apparatus may include a transflective film 5. The transflective film 5 may be a WGP, a beam splitter, a polarization beam splitter, or a transflective glass or plastic. An inclined angle of the transflective film 5 may be fixed or may be variable.

The combiner 11 may transfer a plurality of images along a plurality of paths to an ocular organ 1, that is, an eye, of a user. Reference numeral 2 denotes a pupil. The combiner 11 may transfer a plurality of images along a plurality of paths to the pupil 2 of the user. For example, a first image transferred by light L1 of a first path and a second image transferred by light L2 of a second path may be transferred/guided to the ocular organ 1 of the user. The light L1 of the first path may be the light that is reflected by the transflective film 5, and the light L2 of the second path may be the light that is transmitted through the transflective film 5.

The first image transferred by the light L1 of a first path may be an image formed in and provided by the display apparatus. The first image is a "display image" provided by an image forming device and may include virtual reality or virtual information. The second image transferred by the light L2 of a second path may be an external image in front of the user's eyes that the user views through the display apparatus. The second image may include a foreground image that the user faces, and may also include a certain background subject. The second image may be an image of a real world. Accordingly, the display apparatus according to an example embodiment may be applied to implement AR or MR.

Figure 24:
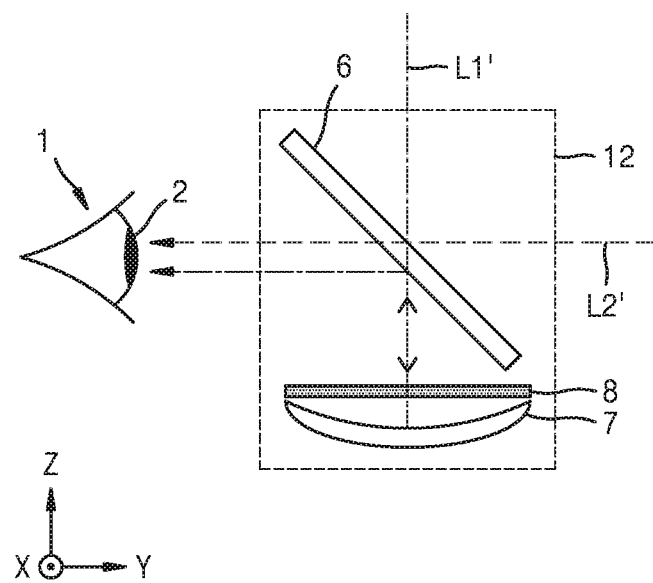
FIG. 24 illustrates a configuration of an optical combiner applicable to a display apparatus according to another example embodiment.

FIG. 24 illustrates a configuration of an optical combiner applicable to a display apparatus according to another example embodiment.

Referring to FIG. 24, an optical combiner (hereinafter, referred to as the combiner) 12 applicable to the display apparatus may include a transflective member 6, a mirror member 7, and a wave plate 8. The wave plate 8 may be arranged between the transflective member 6 and the mirror member 7. The transflective member 6 may be a WGP, a beam splitter, or a polarization beam splitter. The mirror member 7 may be a concave mirror, and the wave plate 8 may be a QWF.

Light L1' of a first path may be transmitted through the transflective member 6, may pass the wave plate 8, may be reflected by the mirror member 7 and then reflected by the transflective member 6, and may proceed toward the pupil 2 of the user. Light L2' of a second path may be transmitted through the transflective member 6 and transferred to the pupil 2 of the user.

The detailed configurations of the combiners 11 and 12 described in FIGS. 23 and 24 are exemplary, and the example embodiment of the disclosure is not limited thereto. The configurations of various optical combiners may be applied to the example embodiments. For example, in addition to the optical combiners 11 and 12 of FIGS. 23 and 24, a diffractive optics based optical combiner or an optical combiner of a holographic optical device may be applied to the example embodiments.

Figure 25:
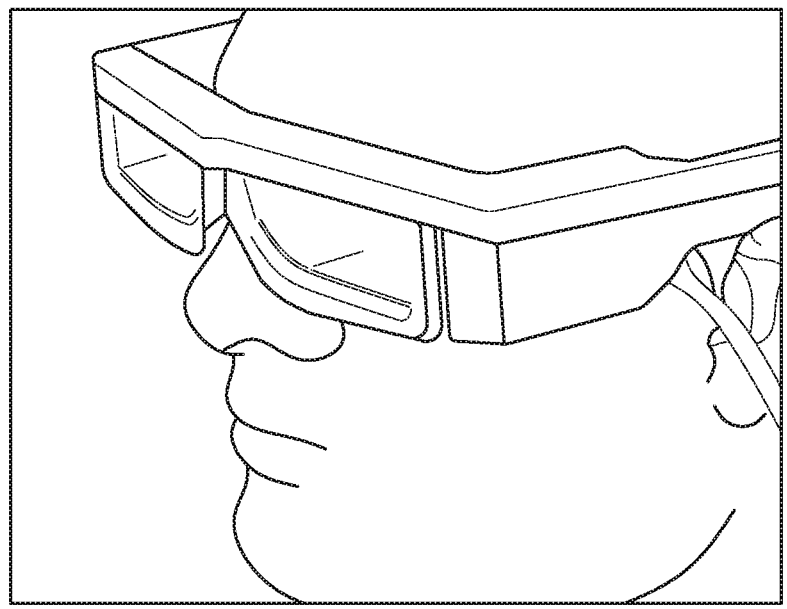
FIGS. 25 and 26 illustrate various electronic devices adopting display apparatuses according to example embodiments.
Figure 26:

At least a part of a display apparatus (optical combiner type display apparatus) according to various example embodiments may constitute a wearable device. In other words, the display apparatus may be applied to a wearable device. For example, the display apparatus may be applied to a HMD device. Furthermore, the display apparatus may be applied to a glasses-type display. FIGS. 25 and 26 illustrate various electronic devices that employ display apparatuses according to the example embodiments. The electronic devices of FIGS. 25 and 26 are examples of HMD devices. The wearable electronic devices of FIGS. 25 and 26 may be operated by being interlinked (or connected) with a smart phone. The display apparatus according to the example embodiment is not limited to the wearable device of FIGS. 25 and 26, and the application field of the display apparatus may be variously changed. Furthermore, the display apparatus according to the example embodiment may be applied not only to implement AR or MR, but also to other fields. In other words, concepts of various example embodiments of the disclosure may be applied to a multi-image display which does not involve AR or MR, enabling a user to simultaneously see a plurality of images.

It should be understood that example embodiments described herein should be considered in a descriptive sense only and not for purposes of limitation. Descriptions of features or aspects within each example embodiment should typically be considered as available for other similar features or aspects in other example embodiments. For example, a person having ordinary skill in the art could have known that the configuration of the display apparatus described with reference to FIGS. 1 and 3 to 26 may be modified in various ways. While example embodiments have been described with reference to the figures, it will be understood by those of ordinary skill in the art that various changes in form and details may be made therein without departing from the spirit and scope as defined by the following claims.

What is claimed is:

1. A display apparatus comprising:
a first optical combiner;
a second optical combiner spaced apart from the first optical combiner;
a first image forming device configured to provide a first image to the first optical combiner;
a second image forming device configured to provide a second image to the second optical combiner; and
a shared optical system arranged between the first and second optical combiners and the first and second image forming devices,
wherein the shared optical system comprises a shared optical path through which the first image and the second image are provided the first optical combiner and the second optical combiner, respectively, and
wherein a first optical path between the first image forming device and the first optical combiner and a second optical path between the second image forming device and the second optical combiner coincide along the shared optical path and traveling directions of the first optical path and the second optical path are opposite to each other.

2. The display apparatus of claim 1, wherein the first image forming device is disposed closer to the second optical combiner than to the first optical combiner, wherein the second image forming device is disposed closer to the first optical combiner than to the second optical combiner, and
wherein the first image is provided to the first optical combiner via the shared optical system, and the second image is provided to the second optical combiner via the shared optical system.

3. The display apparatus of claim 1, wherein the shared optical system forms an optical bridge that connects the first and second optical combiners to each other.

4. The display apparatus of claim 1, wherein an optical process of the first image provided by the first image forming device through the shared optical system is the same as an optical process of the second image provided by the second image forming device through the shared optical system.

5. The display apparatus of claim 1, wherein the shared optical system has a substantially symmetrical structure with respect to the first and second image forming devices.

6. The display apparatus of claim 1, wherein the shared optical system comprises at least one of a refractive optical member, a polarization optical member, a reflective optical member, a diffractive optical member, and a variable optical member.

7. The display apparatus of claim 1, wherein the shared optical system comprises a variable optical device.

8. The display apparatus of claim 7, wherein the variable optical device is located at an optically central portion of the shared optical system, and
wherein the first and second image forming devices are provided at positions that are optically symmetrical about the variable optical device.

9. The display apparatus of claim 7, wherein the variable optical device is configured to vary a focus of light transmitted by the variable optical device.

10. The display apparatus of claim 7, wherein the variable optical device comprises at least one of a variable lens device and a variable mirror device.

11. The display apparatus of claim 7, wherein the variable optical device is configured to be controlled to vary optical characteristics of the variable optical device according to a signal output by at least one of the first and second image forming devices.

12. The display apparatus of claim 7, further comprising an imaging device,
wherein the variable optical device is configured to be controlled to vary optical characteristics of the variable optical device according to a signal output by the imaging device.

13. The display apparatus of claim 7, wherein the variable optical device is configured such that optical characteristics of the variable optical device are continuously or discontinuously modulated.

14. The display apparatus of claim 1, further comprising at least one of a first separate optical system provided between the shared optical system and the first optical combiner and a second separate optical system provided between the shared optical system and the second optical combiner, the at least one of the first separate optical system and the second separate optical system being arranged outside the shared optical system.

15. The display apparatus of claim 14, wherein the first separate optical system comprises at least one optical member that is provided on at least one of a side of an incident portion of the first optical combiner and a side of an exit portion of the second image forming device, and wherein the second separate optical system comprises at least one optical member that is provided on at least one of a side of an incident portion of the second optical combiner and a side of an exit portion of the first image forming device.

16. The display apparatus of claim 1, further comprising:
a first transflective polarizer provided between the second image forming device and the shared optical system; and
a second transflective polarizer provided between the first image forming device and the shared optical system.

17. The display apparatus of claim 16, wherein the first transflective polarizer is configured to reflect light having a first polarization direction and the second transflective polarizer is configured to reflect light having a second polarization direction that is different from the first polarization direction, or
wherein the first and second transflective polarizers are configured to reflect light having a same polarization direction, and the shared optical system comprises a pair of quarter wave films that are symmetrically arranged between the first and second image forming devices.

18. The display apparatus of claim 1, wherein the shared optical system comprises a first transflective polarizer adjacent to the second optical combiner and a second transflective polarizer adjacent to the first optical combiner,
wherein the first transflective polarizer is provided between the first image forming device and the second optical combiner,
wherein the second transflective polarizer is provided between the second image forming device and the first optical combiner, and
wherein the display apparatus further comprises:
a first linear polarizer provided between the first transflective polarizer and the first image forming device;
a second linear polarizer provided between the second transflective polarizer and the second image forming device;
a first mirror provided between the shared optical system and the first optical combiner; and
a second mirror provided between the shared optical system and the second optical combiner.

19. The display apparatus of claim 18, wherein the first transflective polarizer is configured to reflect light having a first polarization direction and the second transflective polarizer is configured to reflect light having a second polarization direction that is different from the first polarization direction, or
wherein the first and second transflective polarizers are configured to reflect light having a same polarization direction, and the shared optical system comprises a pair of quarter wave films that are symmetrically arranged between the first and second image forming devices.

20. The display apparatus of claim 1, wherein the shared optical system comprises a first transflective polarizer adjacent to the second optical combiner and a second transflective polarizer adjacent to the first optical combiner,
wherein the first transflective polarizer is provided between the first image forming device and the second optical combiner,
wherein the second transflective polarizer is provided between the second image forming device and the first optical combiner, and
wherein the display apparatus further comprises:
a first linear polarizer provided between the first transflective polarizer and the first image forming device;
a second linear polarizer provided between the second transflective polarizer and the second image forming device;
a first reflection member arranged to face the first image forming device with the first transflective polarizer interposed between the first reflection member and the first image forming device, the first reflection member being configured to generate polarization rotation;
a second reflection member arranged to face the second image forming device with the second transflective polarizer interposed between the second reflection member and the second image forming device, the second reflection member being configured to generate polarization rotation;
a first mirror provided between the shared optical system and the first optical combiner; and
a second mirror provided between the shared optical system and the second optical combiner.

21. The display apparatus of claim 20, wherein the first transflective polarizer is configured to reflect light having a first polarization direction and the second transflective polarizer is configured to reflect light having a second polarization direction that is different from the first polarization direction, or
wherein the first and second transflective polarizers are configured to reflect light having a same polarization direction, and the shared optical system further comprises a pair of quarter wave films that are symmetrically arranged between the first and second image forming devices.

22. The display apparatus of claim 1, further comprising:
a first transflective polarizer provided between the second optical combiner and the first image forming device;
a second transflective polarizer provided between the first optical combiner and the second image forming device;
a first linear polarizer provided between the first transflective polarizer and the first image forming device;
a second linear polarizer provided between the second transflective polarizer and the second image forming device;
a first reflection member arranged to face the shared optical system with the second transflective polarizer interposed between the first reflection member and the shared optical system, the first reflection member being configured to generate polarization rotation; and
a second reflection member arranged to face the shared optical system with the first transflective polarizer interposed between the second reflection member and the shared optical system, the second reflection member being configured to generate polarization rotation.

23. The display apparatus of claim 22, wherein the first transflective polarizer is configured to reflect light having a first polarization direction and the second transflective polarizer is configured to reflect light having a second polarization direction that is different from the first polarization direction, or
wherein the first and second transflective polarizers are configured to reflect light having a same polarization direction, and the shared optical system comprises a pair of quarter wave films that are symmetrically arranged between the first and second image forming devices.

24. The display apparatus of claim 1, further comprising:
a first transflective polarizer provided between the second image forming device and the shared optical system;
a second transflective polarizer provided between the first image forming device and the shared optical system;
a first linear polarizer provided between the first image forming device and the second transflective polarizer;
a second linear polarizer provided between the second image forming device and the first transflective polarizer;
a first reflection member arranged to face the first optical combiner with the first transflective polarizer interposed between the first reflection member and the first optical combiner, the first reflection member being configured to generate polarization rotation; and
a second reflection member arranged to face the second optical combiner with the second transflective polarizer interposed between the second reflection member and the second optical combiner, the second reflection member being configured to generate polarization rotation.

25. The display apparatus of claim 24, wherein the first transflective polarizer is configured to reflect light having a first polarization direction and the second transflective polarizer is configured to reflect light having a second polarization direction that is different from the first polarization direction, or
wherein the first and second transflective polarizers are configured to reflect light having a same polarization direction, and the shared optical system comprises a pair of quarter wave films that are symmetrically arranged between the first and second image forming devices.

26. The display apparatus of claim 1, wherein the first and second images comprise augmented reality or mixed reality images.

27. The display apparatus of claim 1, wherein the display apparatus is a see-through display apparatus.

28. The display apparatus of claim 1, wherein the display apparatus is a head mounted display device.

29. The display apparatus of claim 1, wherein the display apparatus is a glasses display apparatus, and
wherein one of the first and second optical combiners corresponds to a left eye of a user and the other of the first and second optical combiners corresponds to a right eye of the user.

30. A display device comprising:
a right-side image forming device configured to generate a right-side image;
a left-side image forming device configured to generate a left-side image, the left-side image forming device being spaced apart from the right-side image forming device;
a right-side image combining device configured to combine the right-side image with a right-side external image to form a right-side combined image; and
a left-side image combining device configured to combine the left-side image with a left-side external image to form a left-side combined image,
wherein the right-side image forming device is provided closer to the left-side image combining device than to the right-side image combining device,
wherein the left-side image forming device is provided closer to the right-side image combining device than to the left-side image combining device, and
wherein an optical path of the right-side image is at least partially coincident with an optical path of the left-side image.

31. The display device of claim 30, further comprising an optical system provided between the right-side image forming device and the left-side image forming device,
wherein the optical system is configured to transmit the right-side image in a first direction, and
wherein the optical system is further configured to transmit the left-side image in a second direction opposite to the first direction.

32. The display device of claim 31, wherein the optical system comprises:
a first optical element configured to reflect the right-side image and to transmit the left-side image; and
a second optical element configured to reflect the left-side image and to transmit the right-side image.

33. The display device of claim 30, wherein the right-side image combining device is configured to transmit the right-side combined image to a right eye of a user, and
wherein the left-side image combining device is configured to transmit the left-side combined image to a left eye of the user.

34. The display device of claim 30, wherein the right-side image forming device and the left-side image combining device are disposed in front of a left eye of a user, and
wherein the left-side image forming device and the right-side image combining device are disposed in front of a right eye of the user.

* * * * *